United States Patent [19]

Daun

[11] 4,366,647
[45] Jan. 4, 1983

[54] EXPANDABLE TREE SUPPORT COLLAR

[76] Inventor: Arthur T. Daun, 6635 Lunde Rd., Everson, Wash. 98247

[21] Appl. No.: 214,224

[22] Filed: May 26, 1981

[51] Int. Cl.$^3$ ............................................. A01G 17/06
[52] U.S. Cl. ......................................................... 47/42
[58] Field of Search ........................ 47/42, 43, 23–24; 24/115 N

[56] References Cited

U.S. PATENT DOCUMENTS

| 199,355 | 1/1878 | Daggett | 47/23 |
|---|---|---|---|
| 203,898 | 5/1878 | Doak | 47/23 |
| 426,106 | 4/1890 | Brooks | 47/23 |
| 664,837 | 1/1901 | Davis | 47/23 |
| 1,040,891 | 10/1912 | Coon | 47/42 |
| 4,318,246 | 3/1982 | Jungbluth | 47/42 |

FOREIGN PATENT DOCUMENTS

| 60400 | 7/1941 | Denmark | 47/43 |
|---|---|---|---|
| 85617 | 9/1895 | Fed. Rep. of Germany | 47/23 |
| 6492 | of 1884 | United Kingdom | 47/43 |

Primary Examiner—Robert E. Bagwill

[57] ABSTRACT

An Expandable Tree Support Collar to aid young transplanted tress or other unstable plantings to remain upright until a sufficient root structure develops. Assembled unit consists of an expandable one and one quarter turn coil to which supporting wires are attached. The device is slipped over the trunk of a tree and the supporting wires affixed to ground attachment points. The design simplifies and speeds tree supporting and eliminates the possibility of trunk constriction possible with other tree support methods.

1 Claim, 3 Drawing Figures

U.S. Patent     Jan. 4, 1983     4,366,647
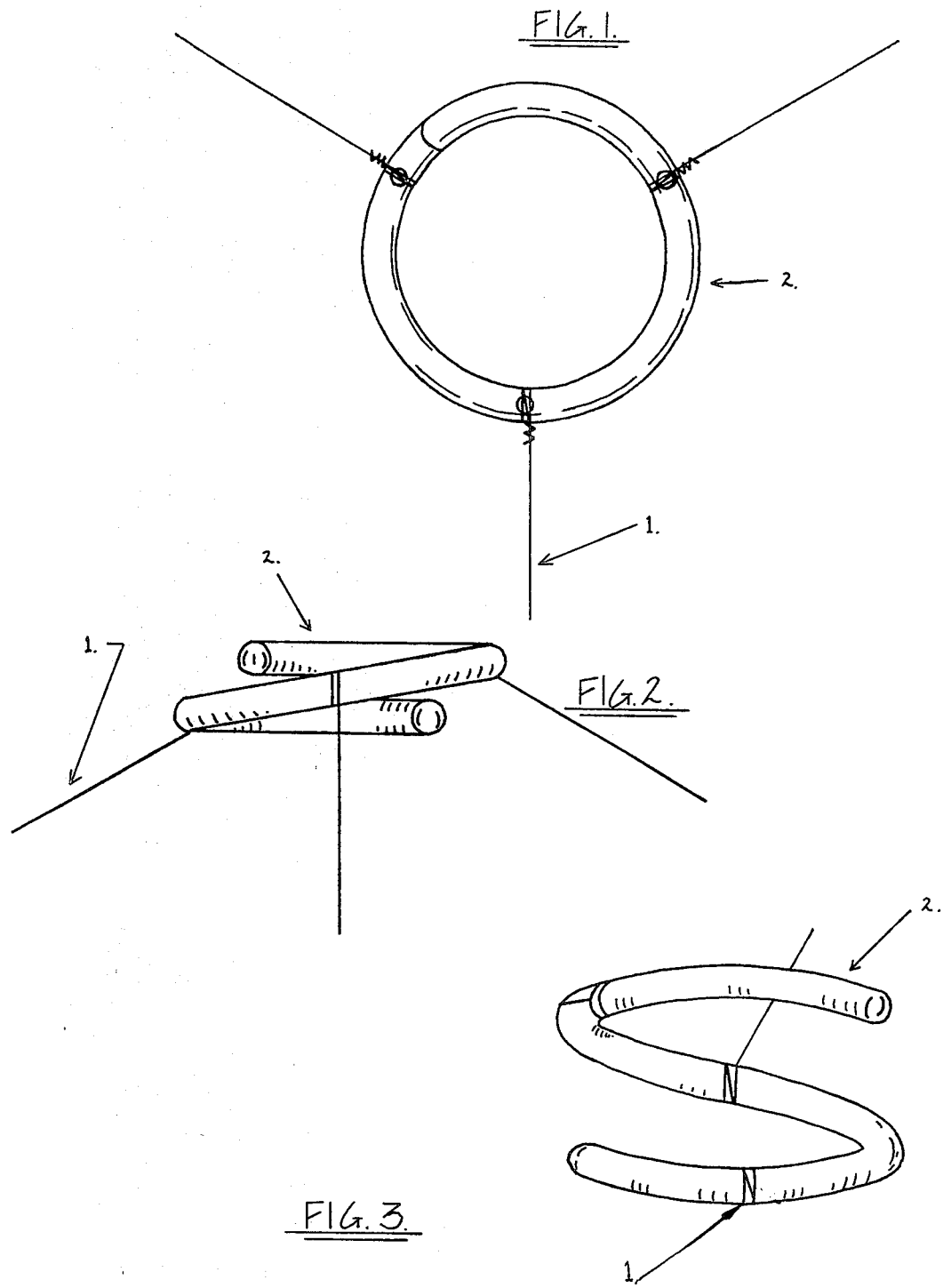

EXPANDABLE TREE SUPPORT COLLAR

The invention is an expandable ring to which are attached support wires. The purpose of the invention is to aid a young transplanted tree or other unstable planting to remain upright until a sufficient root structure develops. In use, the collar is placed around the trunk of a young transplanted tree or other unstable planting by manually separating the two ends of the ring and allowing the trees trunk to pass into the interior of the ring. Following completion of this act, the support wires are attached tautly to stakes or other solid objects in the vicinity of the tree. FIG. 1 shows a top view of the device, as it would appear when in place around the trunk of a young tree. The scale is true. The size of the device shown would be useful for many landscaping applications. The device could however be constructed to any size to which an application was found.

FIG. 2 is a side view of the device as it would look when in place around a tree trunk. In both views the support wires, numeral 1, are not drawn out to their complete length.

FIG. 3 shows the device in an expanded position, as the ring (2) would appear when manually held open to allow it to pass around a tree trunk. Support wires are shown coiled prior to their being attached to support points. The ring (2) is shown round in cross section. This is not critical to the design.

Material of which the ring is composed must be flexible enough to permit its opening, (FIG. 3), and expansion without fracturing. A rubber or plastic casting would be a possible construction method. Support wire attachments to the ring could be accomplished either by wrapping, (as shown), or by attachment to drilled holes within the ring itself.

The use of such an Expandable Tree Support Collar improves upon existing tree support method in two ways: Time savings to the planter, and protection to the tree. Existing means commonly used to support young trees require that each support wire used be passed around the tree trunk, padded to protect the trunk from abrasion, and then be reattached to itself at a location close to the trunk of the tree.

As opposed to this, the tree support collar does not require padding, nor the reattachment of the support wire to itself. As the tree trunk grows in diameter, the collar also expands in diameter. As opposed to this, the existing tree support method discribed previously must be periodically adjusted, and or removed to prevent injury to the tree from constriction.

I claim:

1. A tree support comprised of a coil of material having a fixed diameter prior to being placed around a tree trunk, the coil diameter being expandable as the diameter of said tree trunk expands, the distance between the coil ends being such that the coil may be readily placed about and removed from said trunk by manipulation of said ends to enlarge said coil, said coil having attached thereto a plurality of support wires adapted to be connected to fixed points about said tree trunk.

* * * * *